United States Patent
Scholl

(10) Patent No.: US 8,595,795 B2
(45) Date of Patent: Nov. 26, 2013

(54) ADMINISTRATION OF COMPUTER TELEPHONY APPLICATIONS THAT ARE CONNECTED TO A PRIVATE BRANCH EXCHANGE VIA A LOCAL NETWORK

(75) Inventor: Gregor Scholl, Dortmund (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1416 days.

(21) Appl. No.: 11/887,287

(22) PCT Filed: Feb. 15, 2006

(86) PCT No.: PCT/EP2006/050938
§ 371 (c)(1),
(2), (4) Date: Sep. 27, 2007

(87) PCT Pub. No.: WO2006/103141
PCT Pub. Date: Oct. 5, 2006

(65) Prior Publication Data
US 2009/0276854 A1    Nov. 5, 2009

(30) Foreign Application Priority Data
Mar. 30, 2005  (DE) .......................... 10 2005 014 522

(51) Int. Cl.
*G06F 7/04*    (2006.01)
*G06F 15/16*   (2006.01)
*G06F 17/30*   (2006.01)

(52) U.S. Cl.
USPC ................. 726/4; 726/26; 370/352; 370/355; 379/196; 379/198

(58) Field of Classification Search
USPC .......... 726/4, 26; 370/352, 355; 379/198, 196
See application file for complete search history.

(56) References Cited

U.S. PATENT DOCUMENTS

| | | | | |
|---|---|---|---|---|
| 5,574,888 A | * | 11/1996 | Panditji et al. | 703/26 |
| 6,035,019 A | * | 3/2000 | Hara | 379/93.05 |
| 6,421,432 B1 | * | 7/2002 | Stanford et al. | 379/110.01 |
| 6,618,476 B1 | | 9/2003 | Szeto et al. | |
| 6,647,099 B1 | | 11/2003 | Durkin | |

(Continued)

FOREIGN PATENT DOCUMENTS

| | | |
|---|---|---|
| DE | 199 10 468 A1 | 9/2000 |
| DE | 199 17 383 C1 | 10/2000 |

(Continued)

*Primary Examiner* — Edan Orgad
*Assistant Examiner* — Kari Schmidt
(74) *Attorney, Agent, or Firm* — Buchanan Ingersoll & Rooney PC

(57) ABSTRACT

An administration of telephony applications conventionally using domain controller-based access authorization methods is provided such to eliminate the need for these methods. In a network where terminal devices are connected to time division multiplexed or packet-oriented network components, a terminal device establishes a communication link to a terminal device-specific adaptation for telephony applications via an interface for telephony applications, and the authorization for importing data is verified. Data is imported via the communication link to affected applications or affected services of the network. Any terminal device can be used to import the data and that no special authorizations are required for access as the proprietary/license keys that are exchanged between the terminal device and the exchange and the domain controller provide protection from unauthorized access to the exchange and to the local network connected thereto. For accessing the exchange and the domain controller, only one authorization check method is required.

20 Claims, 1 Drawing Sheet

(56) References Cited

U.S. PATENT DOCUMENTS

| | | | |
|---|---|---|---|
| 6,650,635 B1* | 11/2003 | Weinstein et al. | 370/352 |
| 7,203,189 B2* | 4/2007 | Pinard et al. | 370/352 |
| 7,451,476 B1* | 11/2008 | Banks et al. | 726/1 |
| 2001/0046287 A1* | 11/2001 | Hoefig | 379/210.01 |
| 2002/0078240 A1* | 6/2002 | Ehrlich et al. | 709/245 |
| 2003/0235281 A1* | 12/2003 | Williams et al. | 379/196 |
| 2004/0001479 A1* | 1/2004 | Pounds et al. | 370/352 |

FOREIGN PATENT DOCUMENTS

| | | |
|---|---|---|
| EP | 1 089 530 A2 | 4/2001 |
| EP | 1 189 415 A2 | 3/2002 |
| WO | 02/39681 A1 | 5/2002 |

\* cited by examiner

ADMINISTRATION OF COMPUTER TELEPHONY APPLICATIONS THAT ARE CONNECTED TO A PRIVATE BRANCH EXCHANGE VIA A LOCAL NETWORK

CROSS REFERENCE TO RELATED APPLICATIONS

This application is the US National Stage of International Application No. PCT/EP2006/050938, filed Feb. 15, 2006 and claims the benefit thereof. The International Application claims the benefits of German application No. 102005014522.1 DE filed Mar. 30, 2005, both of the applications are incorporated by reference herein in their entirety.

FIELD OF INVENTION

The present invention relates to a method and communication system for importing data into communication networks.

BACKGROUND OF INVENTION

In addition to analog and digital telephones, computers, especially personal computers with a telephone function or IP phones, are increasingly being connected via a local network LAN to exchanges, for example private branch exchanges. Different access procedures are usually provided in each case for importing data or information into the private branch exchanges or into the local network, especially a local IP network, in the sense of administering these networks.

Qualified access is provided for accessing a local network, in which, with the aid of a domain controller both the authentication and also the import of the data are handled. The authentication is required since only authenticated users are allowed to use the network, especially to administer it. Further protection measures are for example firewalls and SSL—Secure Socket Layer SS is a protocol for encrypted transmission of data.

To import data or information into a private branch exchange, in order to administer said data for example, special interfaces are provided, which are likewise equipped with specific protection mechanisms. In this case the authentication procedures—for example Hipath Licensing—especially ensure that only authorized users, specifically administrators, import data into the private branch exchange and can administer the components concerned.

The local network LAN and the private branch exchange are administered and configured via different interfaces and using different associated protection mechanisms, for example authentication and data transmission procedures. This means having to enter and reconcile the data to be imported several times.

SUMMARY OF INVENTION

The underlying object of the invention is to be seen as improving the importing of data into exchange systems with a local network. The object is achieved by the features of claims.

The significant aspect of the inventive method or communication system lies in the establishment from a terminal via an interface for telephone applications (TAPI) of a communication link to a terminal-specific adaptation for telephone applications (TAPI Service Provider) in which case the authorization for importing the data is verified. Subsequently the data is imported via the communication link to the relevant applications or services of the network. One advantage of the invention can be seen in the fact that the importation of data into a Windows domain of a local network can be undertaken by any terminal of the exchange. A further advantage lies in the fact that no specific authorizations are required in this case, since the protection/license authorizations which are exchanged between the terminal and the exchange guarantee a preventive protection against unauthorized access to the exchange system and to the local network connected to it. Advantageously only one authorization method, namely that of the private branch exchange (PBX) is needed for access to the exchange and Domain Controller (DC).

Advantageous developments of the method are to be found in the subclaims

BRIEF DESCRIPTION OF THE DRAWINGS

The invention will be explained below with reference to two figures. The figures show FIG. 1 a topology in which the invention can be implemented, FIG. 2 an overview of the inventive functions.

DETAILED DESCRIPTION OF INVENTION

Figure 1:
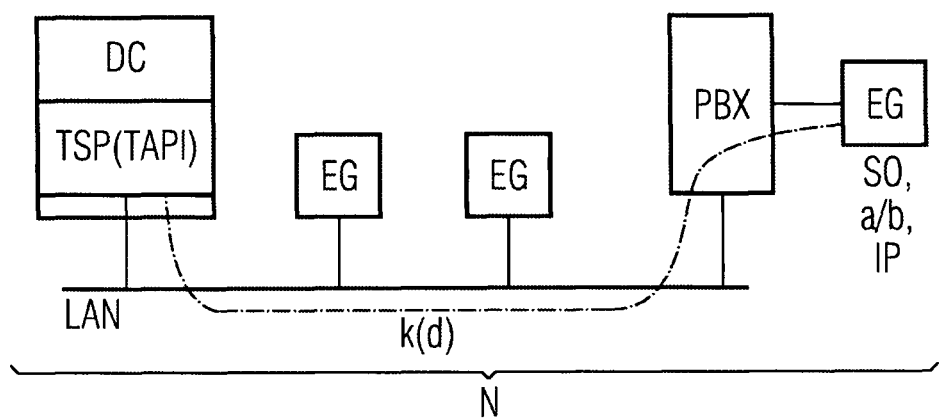

FIG. 1 shows a network topology in which the inventive method can be employed. Connected to an exchange, in the exemplary embodiment a private branch exchange PBX referred to below by its abbreviation PBX, are terminals EG—in FIG. 1 one typical terminal EG is shown, with the terminals being connected to the PBX via an analog a/b interface a/b, a digital ISDN interface S0 or via the Internet IP, including the respective signaling procedures. The PBX is additionally connected via an interface to a local network LAN—referred to below by the abbreviation LAN, to which further terminals EG can be connected. In addition the LAN is routed to a Domain Controller DC, in which a TAPI Service Provider TSP—referred to below by its abbreviation TSP—is provided.

TAPI involves an Application Programming Interface (API) for telephone applications (T) especially for Windows-based personal computers and LANs. A TSP adapts the Application Programming Interface TAPI to the respective terminal-specific characteristics. The underlying telephone functions for connection signaling and further telephone-specific service features are controlled with the aid of the TSP.

A Domain Controller DC administers the terminals EG of the network N. The Domain Controller DC can be used to determine which terminals EG may log on with which password, the files or network facilities to which they have access etc.

Inventively a connection to the TSP is established from a terminal EG of the PBX via the PBX. To this end a predetermined telephone number is dialed by the terminal which is identified by the TSP. As part of the connections setup an exchange of license keys is undertaken between the terminal and the PBX in accordance with Hipath Licensing. This exchange of the license keys ensures that only authorized users can obtain access to the PBX. Because of this authentication of the terminal EG or of the user, a further authentication procedure for access to the TSP can be dispensed with. Usually this type of access to a Windows domain would only be possible with further extensive access authorization procedures.

After the authentication of the terminal EG or of the user, the data d to be imported into the TSP is determined and stored via the terminal EG.

Figure 2:
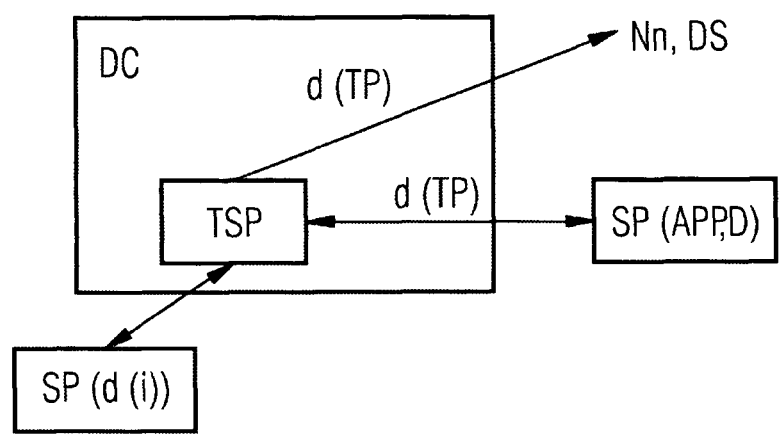

FIG. 2 shows the division of functions of the TSP in relation to the transferred data d. The transferred data d to be imported mostly represents configuration data which will be forwarded or transmitted to specific applications AP or services D in the sense of a configuration of these applications AP or services D. To this end the data d contains information i which specifies the application AP or the service D to which the data d or the file or files contained in the data d is to be transmitted or is to be imported into the latter. The data d or the files contained within it are buffered in the Domain Controller DC in a memory SP and subsequently, or at a predetermined point in time, forwarded to the relevant applications AP or services. In addition the data d can also be forwarded to other networks Nn or other domain services DS. The transmission protocol (TP) can be adapted to the data d or files.

The method or communication system in accordance with the invention is not restricted to the exemplary embodiment but can be used in all networks for which packet-oriented network components such as local network interoperate with time-division multiplexing-oriented network components such as telephone exchanges. Of importance here is that a communication link is established from a terminal of the network to a TSP, with the available authentication procedure between terminal and PBX advantageously being used as the authentication procedure for access to the TSP. This enables the usual authorization procedures in the Windows domain TSP to be dispensed with and thus enables both the programming effort and also the operating efforts for access to the TSP to be reduced.

The invention claimed is:

1. A method for importing data into a network having a circuit switched component and a packet switched component comprising:
   establishing a connection from a first terminal to a domain controller having an application programming interface for telephone applications service provider (TSP), the first terminal being connected to an exchange device, the exchange device being connected to the circuit switched component and the packet switched component of the network, and the TSP being connected to the packet switched component of the network, the connection being established via a method comprising:
      exchanging a security provision between the first terminal and the exchange device in accordance with an authorization method of the exchange device;
      providing access to the exchange device and the TSP; and
   importing data to the TSP; and
   wherein access to the TSP is provided when access to the exchange device is provided via the authorization method of the exchange device.

2. The method of claim 1 wherein the data comprises configuration or administration data for at least one application or at least one service on the network.

3. The method of claim 2 further comprising forwarding the data to the at least one application or the at least one service on the network.

4. The method of claim 1 wherein no further authentication for the first terminal is required for access to the TSP.

5. The method of claim 1 wherein the exchange device is a private exchange or a private branch exchange (PBX).

6. The method of claim 5 wherein the first terminal is connected to the PBX via an analog interface, a digital Integrated Services Digital Network interface, or the Internet.

7. The method of claim 1 wherein the authorization method of the exchange device is HiPath Licensing.

8. The method of claim 1 further comprising forwarding the data to networks or domain services outside of the network.

9. The method of claim 1 wherein the method for establishing the connection is further comprised of dialing a telephone number via the first terminal and the TSP identifying the dialed telephone number.

10. The method of claim 1 wherein the security provision comprises a license key.

11. A communication system for a network, comprising:
   an exchange device configured to connect to a circuit switched component of the network and a packet switched component of the network;
   a first terminal configured to connect to the circuit switched component;
   a domain controller having an application programming interface for telephone applications service provider (TSP);
   wherein the exchange device establishes a connection between the first terminal and the TSP; and
   wherein the exchange device accepts a security provision from the first terminal in accordance with an authorization method of the exchange device and provides access to the exchange device and the TSP; and
   wherein access to the TSP is provided to the first terminal based on the authorization method of the exchange device and is provided to the first terminal when access is provided to the exchange device; and
   wherein the domain controller imports data to the TSP.

12. The communication system of claim 11 wherein the TSP is implemented by a program product contained in a non-transitory computer readable medium.

13. The communication system of claim 11 wherein no further authentication is required for access to the TSP.

14. The communication system of claim 11 wherein the data comprises configuration data or administration data for at least one application or at least one service on the network.

15. The communication system of claim 11 wherein the domain controller forwards the data to the at least one application or the at least one service on the network.

16. The communication system of claim 11 wherein the exchange device is a private exchange or a private branch exchange (PBX).

17. The communication system of claim 11 wherein the first terminal is connected to the exchange device via an analog interface, a digital Integrated Services Digital Network interface, or the Internet.

18. The communication system of claim 11 wherein the authorization method of the exchange device is HiPath Licensing.

19. The communication system of claim 11 wherein the connection between the first terminal and the TSP is established when a telephone number is dialed via the first terminal and the TSP identifies the dialed telephone number.

20. The communication system of claim 11 wherein the security provision comprises a license key.

* * * * *